March 5, 1935.  G. B. WATKINS  1,992,976
PROCESS OF PRODUCING CURVED COMPOSITE GLASS
Filed May 14, 1934
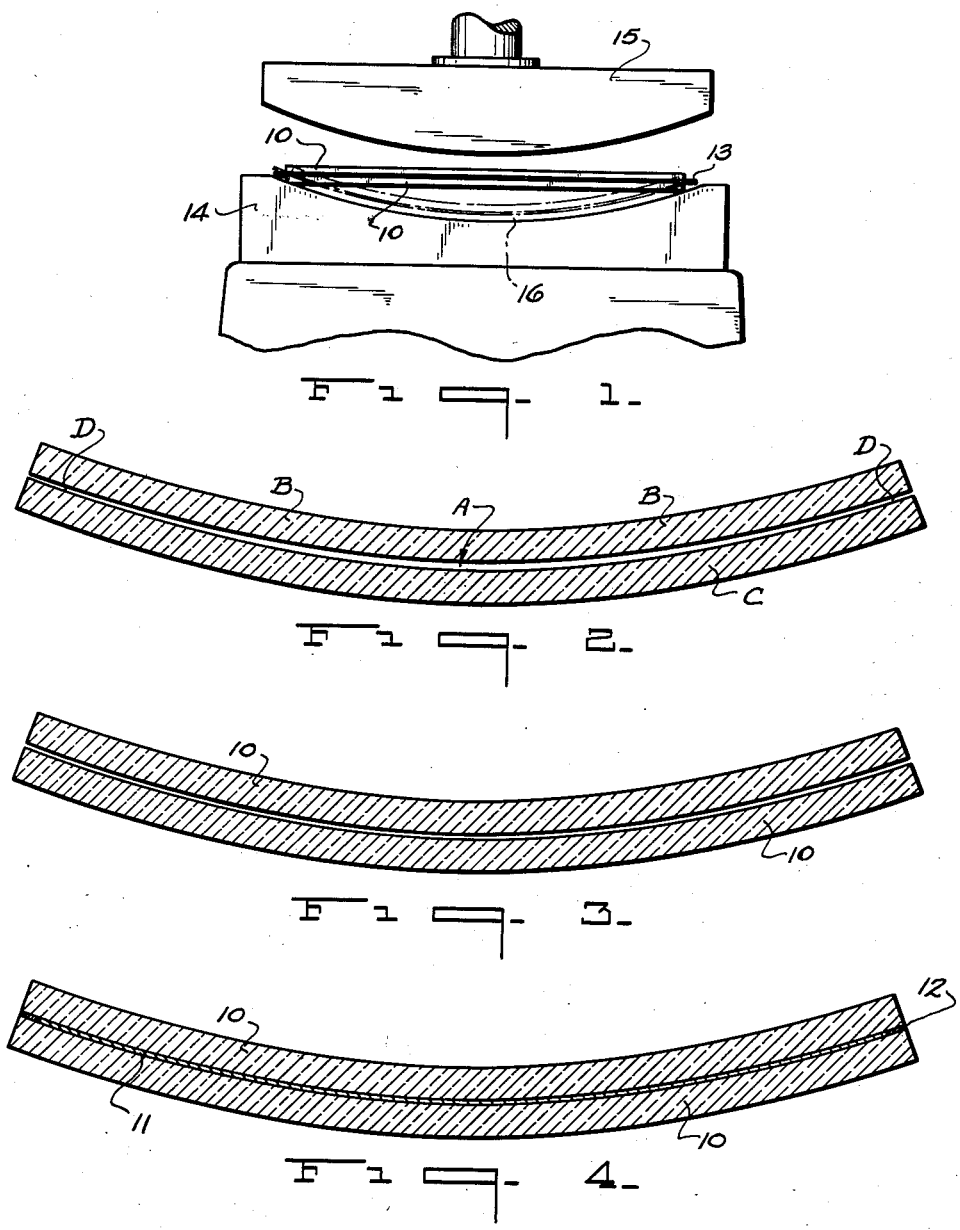
Inventor
GEORGE B. WATKINS.
By Frank Fraser
Attorney Patented Mar. 5, 1935

1,992,976

UNITED STATES PATENT OFFICE 1,992,976

PROCESS OF PRODUCING CURVED COMPOSITE GLASS

George B. Watkins, Toledo, Ohio, assignor to Libbey-Owens-Ford Glass Company, Toledo, Ohio, a corporation of Ohio Application May 14, 1934, Serial No. 725,575

3 Claims. (Cl. 49—81)

The present invention relates to the art of laminated safety glass manufacture and particularly to the making of curved or bent laminated safety glass.

Laminated safety glass is a composited structure usually composed of two sheets of glass and an interposed layer of some tough transparent plastic material adherent to the inner surfaces of the glass sheets. It has been customary to use such plastic materials as pyroxylin plastic, cellulose acetate plastic, and synthetic resins in the making of such composited glass.

The consideration being at present given to the design and manufacture of automobiles embodying so-called streamline contours has presented the problem of producing curved or bent laminated safety glass. The manufacture of flat or plane laminated safety glass has been difficult enough but curved or bent laminated safety glass is even more difficult because of the problem of nesting the glass, plastic, and adhesive material in proper order and then applying the requisite degree of heat and pressure to obtain adhesion between the various laminations.

So far as is known, no process has been developed whereby a flat piece of laminated safety glass can be bent to the proper curvature after the laminations have been bonded together. It is therefore necessary to bend the glass sheets to the proper configuration prior to bonding.

The present invention contemplates bending of the glass sheets prior to bonding to the plastic layer in such a way that the possibility of introducing strain and other unfavorable conditions into the finished sheet will be minimized, if not entirely eliminated.

Prior to my invention and for many years, it has been the practice to bend two sheets of glass, one directly upon the other, on a common mold, and while the use of glass bent in this way has met with moderate success, the results have not, in my opinion, been entirely satisfactory because when the glass sheets so bent are separated by the plastic layer and the assembly subjected to the necessary heat and pressure to obtain adequate bonding, the glass sheets are placed under a strain.

I have discovered that the glass sheets can be bent in pairs by placing a middle separating strip, of substantially the same thickness as the layer of plastic subsequently used, between the glass sheets and then bending the glass sheets with the interposed separator to the desired configuration, with the result that laminated safety glass made by glass sheets bent in this way are relatively much freer from strain and therefore give a composite structure more satisfactory than has heretofore been obtained.

In the drawing wherein like numerals are employed to designate like parts throughout the same, Fig. 1 is a diagrammatic showing of a type of mold that may be used in carrying out my invention, Fig. 2 is a diagrammatic representation, slightly exaggerated for the purposes of illustration, showing the relation of the glass sheets when bent in pairs over a common mold at the same time when a spacer strip is not used, Fig. 3 is a similar view showing the relation between the glass sheets when bent with the use of spacer strips, and Fig. 4 is a similar view of a finished sheet of bent or curved laminated safety glass.

As shown in Fig. 4, the laminated safety glass comprises the two sheets of glass 10 with the interposed layer of plastic 11. The present invention is in no way concerned with the particular plastic or bonding material employed in the making of the laminated safety glass. However, it may be pointed out that, generally speaking, the thickness of the plastic layer 11 is upwards of .020" and ordinarily is in the neighborhood of .025". It has been the practice to coat either the glass, the plastic, or all of the laminations with the adhesive or other bonding material and then, after arranging the laminations in proper superimposed relationship, subjecting the sandwich thus formed to the combined action of considerable heat and pressure, the amount of heat and pressure required being of course dependent upon the character of plastic and bonding means used.

There are also numerous types of pressing equipment such as autoclaves, platen presses, roller devices, and the like used to exert the necessary pressure accompanied by heating.

As a matter of precaution and to protect the plastic layer and the bond between the plastic layer and the glass sheets, the marginal portions of the plastic can be removed to create a channel in which a weather-proofing material can be inserted to form the seal 12 shown in Fig. 4.

In forming the glass sheets to the desired curvature in accordance with my invention, a metal separator strip, which may be of any suitable non-corrosive material such as a sheet of galvanized iron, is placed between the two flat glass sheets as shown in Fig. 1, the thickness of the separator 13 being aproximately the same as the thickness of the plastic layer 11 later to be bonded between the glass sheets 10. Therefore, if the plastic layer 11 is to be .025" in thickness, a separator strip approximately the same thickness should be selected.

To get the desired curvature, a mold comprising the concave portion 14 and the convex portion 15 can be used. It will be understood that the showing of the mold is purely diagrammatic as any type of mold, whether convex or concave, can be used in practicing the present invention. Likewise, heating of the glass and mold can be carried out in a continuous kiln if preferred, so long as the requisite temperature of glass is attained to permit proper shaping thereof. With the type of mold illustrated, after the glass has arrived at the proper temperature, the convex member 15 is pressed upon the upper surface of the upper sheet of glass is such a way as to force the glass and metal separator down into the mold so that it will assume the position illustrated in dotted lines and designated by the numeral 16.

Usually, plate glass, that is a glass whose surfaces have been ground and polished, is used in the making of laminated safety glass, and as it is not desirable to surface the glass after the composited structure has been produced, the treatment of the glass sheets during the bending operation should not be such as to destroy or mar the finish of the glass. Practice has shown that glass can be heated and caused to conform to the contour of an iron mold without destroying the finish of the glass, although obviously the application of the heat should be done with care and the pressure applied to the glass should not be excessive. Preferably, it should be only sufficient to get the desired shaping of the glass.

In Fig. 2 the condition of the glass sheets when bent in pairs on a common mold at the same time without the use of the separator strip 13 is shown. It will be noted that the gap A between the glass sheets B and C is somewhat greater than the gap D at both ends of the glass when the glass sheets are moved apart through a distance the same as the thickness of the plastic 11 to be bonded between the glass sheets. Because of this variation in the space between the adjacent surfaces of the glass sheets when separated to accommodate the plastic material, it will be seen that to bond the glass to the plastic, the glass must necessarily be placed under a strain. This strained condition of the glass is very undesirable because, among other things, the glass will at all times have the urge to separate from the plastic, will more readily crack, in addition to complicating the bonding operation itself because of the possibility of trapping air and excess bonding material between the laminations during bonding.

Fig. 3 very clearly shows that the space between the glass sheets when separated through a distance substantially the same as the thickness of the plastic 11, is substantially uniform so that when the plastic is bonded between the glass sheets, they are freer of strain and therefore give a laminated structure much more satisfactory from a commercial as well as a manufacturing view-point. This equidistant spacing of the glass sheets is obtained by using the spacer strip or sheet as above described, whereas the uneven spacing shown in Fig. 2 is created when such a separator is not used when shaping the glass sheets.

I claim:

1. The process of producing curved laminated safety glass composed of two sheets of glass and an interposed layer of plastic material adherent to the inner surfaces thereof, consisting in placing between two glass sheets a metal separator having a thickness substantially the same as the thickness of the plastic layer to be bonded between the glass sheets, applying heat and pressure to bend the glass sheets and separator to the desired contour, then removing the metal separator, and finally bonding a layer of plastic between said glass sheets.

2. The process of producing curved laminated safety glass composed of two sheets of glass and an interposed layer of plastic material adherent to the inner surfaces thereof, including the step of bending said sheets of glass in such a manner that when they are spaced apart a distance equal to the thickness of the layer of plastic to be bonded therebetween, the inner surfaces of the glass sheets will be equidistant throughout their entire areas.

3. The process of producing curved laminated safety glass composed of two sheets of glass and an interposed layer of plastic material adherent to the inner surfaces thereof, consisting in placing a non-corrosive metal separator between the glass sheets, applying heat and pressure thereto to bend the same to the desired configuration, then placing a layer of plastic material having a thickness approximately the same as the thickness of the non-corrosive metal separator between the glass sheets, and bonding the glass sheets and plastic together into a composited structure.

GEORGE B. WATKINS.